United States Patent [19]

Orlando

[11] 4,011,590
[45] Mar. 8, 1977

[54] INTERNAL DIVISION ACTUATION OF VENTILATED FLOPPY DISK STACK

[75] Inventor: Anthony W. Orlando, Highland, N.Y.

[73] Assignee: International Business Machines Corporation, Armonk, N.Y.

[22] Filed: Nov. 4, 1975

[21] Appl. No.: 628,623

[52] U.S. Cl. .................................. 360/99; 360/98; 360/135

[51] Int. Cl.² ...................... G11B 5/82; G11B 5/54; G11B 25/04

[58] Field of Search ................ 360/99, 98, 97, 135, 360/105, 102–103, 86; 206/444; 346/137

[56] References Cited

UNITED STATES PATENTS

| | | | |
|---|---|---|---|
| 3,509,553 | 4/1970 | Krijen | 360/98 |
| 3,867,723 | 2/1975 | Penfold et al. | 360/99 |
| 3,936,880 | 2/1976 | McGinnis et al. | 360/99 |
| 3,940,794 | 2/1976 | Griffiths et al. | 360/99 |

OTHER PUBLICATIONS

B484,482, Mar., 1976, Barkhuff et al., 360/98.

*Primary Examiner*—Alfred H. Eddleman
*Attorney, Agent, or Firm*—Robert Lieber

[57] ABSTRACT

A hollow tubular actuator device operates through an enclosure formed by aligned holes in multiple floppy type storage disks. The disks, separated by interposed ventilating spacers, are clamped between inflexible end plates in a closely spaced continually rotating stack assembly. The actuator preferably rotates with the stack and translates axially relative to the disks and spacers. The actuator has a slotted opening for transmitting variable pressure to a selected spacer (address) in the stack and thereby varies the aggregate pressure equilibrium in the stack due to centrifugal air flow. This acts to deflect the orbits of disks peripherally, on either side of the selected address space, forming a gap useful for obtaining external access to otherwise inaccessible storage surfaces adjacent the selected space.

10 Claims, 16 Drawing Figures

INTERNAL DIVISION ACTUATION OF VENTILATED FLOPPY DISK STACK

CROSS REFERENCES TO RELATED PATENT APPLICATIONS

1. U.S. Patent Application, Ser. No. 414,614, by R. J. Penfold et al, filed Nov. 7, 1973, entitled "Multiple Flexible Disk File," now U.S. Pat. No. 3,867,723, issued Feb. 18, 1975, assigned to the assignee of this application.

2. U.S. Patent Application, Ser. No. 484,830, by B. W. McGinnis et al, filed July 1, 1974, entitled "Bistable Deflection Separation of Flexible Disks", now U.S. Pat. No. 3,936,880 assigned to the assignee of this application.

3. U.S. Patent Application, Ser. No. 375,986, by B. W. McGinnis et al, filed July 2, 1973, entitled "Selectively Tensioned Transducer Assembly For Operation In Compliant Relation to Individual Memory Discs Of A Partitionable Aggregate of Rotating Flexible Discs," now U.S. Pat. No. 3,810,243, issued May 7, 1974, assigned to the assignee of this application.

4. Patent application, Ser. No. 628,622 by A. W. Orlando and J. A. Weidenhammer, for "Internal Division Actuation of Ventilated Floppy Disk Stack," filed

BACKGROUND OF THE INVENTION

1. Field of the Invention

The invention relates to direct access storage files composed of co-rotating pliant disks which are stacked at intervals too narrow for transducing access and particularly to means for effecting separation of disks in such files for external transducing access.

2. Description of the Prior Art

Disclosures cross-referenced above indicate evolutionary development of direct access mass storage files of floppy disks stacked at close (inaccessible) intervals determined by ventilating spacers and confined between co-rotating inflexible end plates. The spacers and end plates permit limited displacements of the rotational orbits of the disk storage surfaces which are useful to widen otherwise inaccessible (address) spaces in the stack sufficiently to allow unobstructed insertion of an externally transported head. The space to be widened can be selected on a random access basis.

Upon completion of transducing operation the head is withdrawn from the selected space and positioned externally for insertion into another selected address space.

Hitherto the separation displacement of the disks has been instigated by application of external force at the outer edges of disks facing the selected space. In earliest arrangements force would be applied continuously to maintain the separation. In a later arrangement (cross-reference 2 above) force applied transiently at the periphery of the stack would trigger a stable self-sustaining displacement of the disk orbits, due to ventilation conditioning of the stack to a state of bistable displacement equilibrium.

One problem with "external actuation" is that since the disks are not peripherally restrained the rotational orbits of individual storage surfaces may vary dynamically, thereby adding a factor of uncertainty to the procedure for locating the address at which to apply the force which instigates separation. Also, since the means employed to apply external force must occupy external space it is likely to increase the aggregate size of the storage system apparatus.

U.S. Pat. No. 2,960,340 (Seidel) discloses internal separation of stacked rigid disks by a co-rotating "actuator" device which translates axially relative to the disks. All of the disks are shifted vertically and the actuator is moved to a selected position where it expands outwardly into the stack to act as a stop. The stack is then released to permit all disks between the actuator and the lowest disk to fall by gravity onto a co-rotating turntable. A head is maneuvered into the space vacated by the dropped portion of the stack for transducing operation.

U.S. Pat. No. 3,130,393 (Gutterman) discloses external division of slidable disks in a piston configuration by pressure applied peripherally at a selected stack position.

SUMMARY OF THE INVENTION

The present invention concerns an improvement upon the method and apparatus invention of cross-reference No. 4 above for splitting a ventilated flexible disk stack by internal action. The spacing between disk storage surfaces in the undivided stack configuration is determined by channeled spacers. The spacers permit ventilating circulation of air to replenish air expelled from between said surfaces by centrifugal action. An internal actuator acts through aligned holes in the disks to add a quantum of pressure to the ventilation pressure in one selected space between a pair of interfacing said surfaces and thereby produces a sustained split (gap) affording transducing access to said interfacing storage surfaces. The gap is formed at any selected position (address) in the stack and an externally transported head is maneuvered into and out of the split space for operation relative to one or both of said interfacing surfaces.

The subject actuator preferably (but not essentially) co-rotates with the disks and comprises a hollow tubular device having a slotted hub alignable with any selected ventilation spacer in the stack. With suitable ventilation pressuring the hub construction allows it to be translated and prepositioned relative to the split stack without disturbing pressure equilibrium of the stack (i.e., without disturbing the split). The hub slot is dimensioned narrower than a disk spacer and designed to transmit variable pressure to a selected inter-disk space (address) in the stack through the associated spacer. This is used to vary the orbital equilibrium of the disk surfaces and thereby to form a sustained split/-gap displacement of said surfaces relative to a selected address. An externally transported head is maneuvered into and out of the gap for transducing operation relative to either of the disk surfaces interfacing at the selected address position.

Such internal split actuation offers several advantages. It can be volumetrically more efficient than external actuation. It can give more reliable address location inasmuch as the actuation force is directed at internal edges of the disk/spacer laminations which, being undisplaceable, are not subject to positional uncertainty due to flutter, wobble or run-out. It does not require any contact with the disks. It employs very small differential pressure forces (i.e., it is mechanically efficient) and it is potentially fast-acting due to low inertia. Another advantage in respect to access timing is that in one mode of operation the actuator can be pre-positioned to the next address position to be split, while the head is still operating in a previously formed split.

The ventilation pressure in the clearance space between the exterior of the actuator and the internal disk/spacer edges is varied to establish monostable and bistable pressure equilibrium conditions in the stack. The nature and utility of this equilibrium phenomenon is disclosed in the above-referenced patent application 484,830 by McGinnis et al (cross-reference No. 2), the disclosure of which is incorporated herein by this reference. The actuator device of the present invention contains a slotted hub useful to exclusively increase pressure momentarily at a single selected position in the stack. This increase is useful, when the stack is undivided and in bistable equilibrium, to displace rotational orbits of the disk surfaces apart at the selected position into a stable "self-sustaining" configuration which provides a uniform gap accommodating an externally transported head.

One aspect of the present invention is in the provision of a "fast-acting" two-channel actuator with control flanges to accelerate split-forming transitions by synchronous application of vacuum, to ventilation spaces symmetrically located on opposite sides of the address space selected to be split while the split is forming.

Another aspect concerns a cross-channel constructional feature of the actuator hub for maintaining equal pressures in clearance spaces on opposite sides of the hub, to facilitate said acceleration and also to permit the actuator to be translated without disturbing the orbital equilibrium of the stack.

The foregoing and other aspects, features, objectives and advantages of the present invention will be more readily appreciated and understood from the following detailed description.

DETAILED DESCRIPTION

1. Introduction

Figure 1:
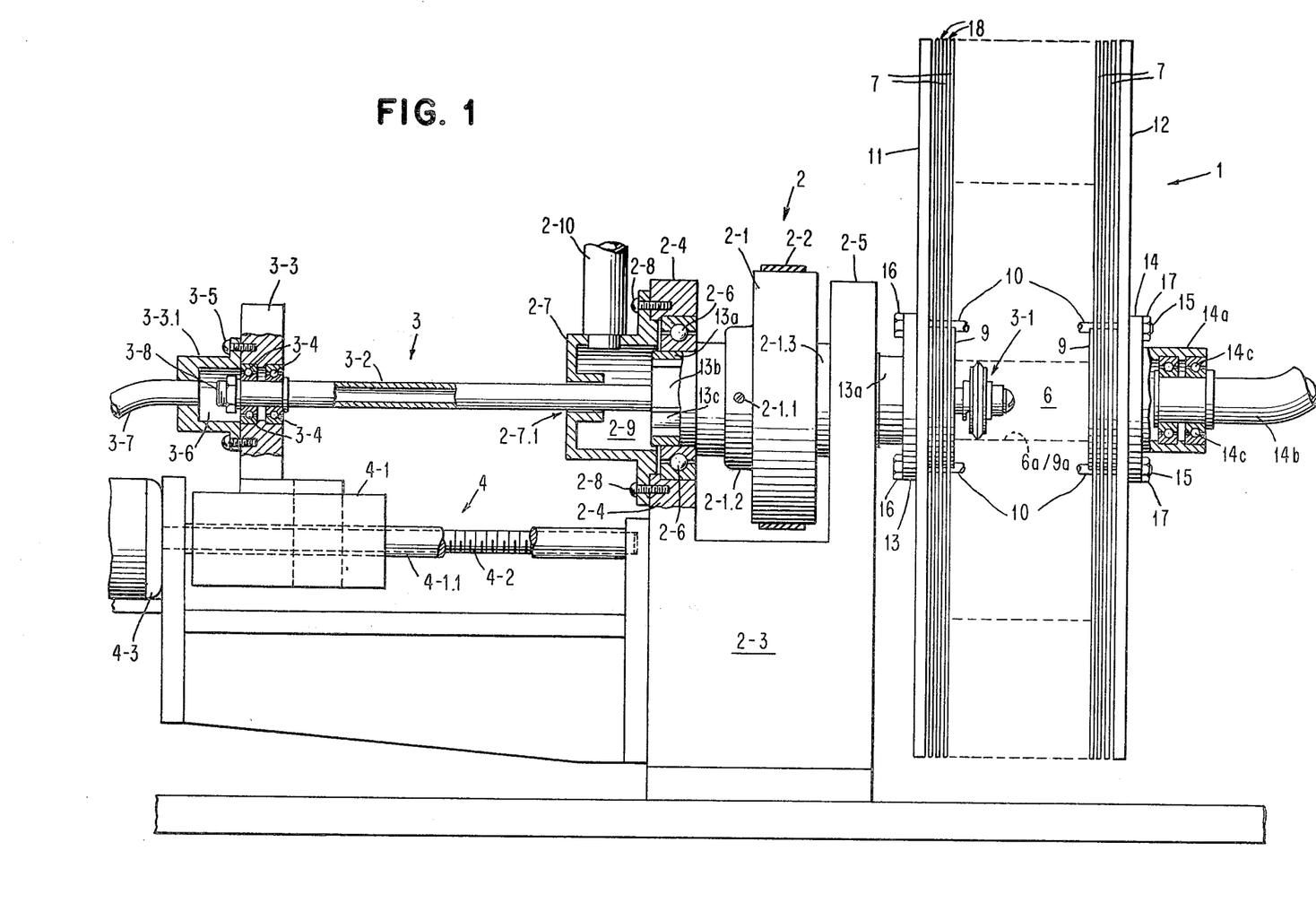
FIG. 1 is an elevational schematic view partially cut away of generic actuator apparatus in accordance with the invention of cross-reference No. 4 above, and a flexible disk stack storage file assembly in which it operates as a subassembly.

Referring to FIG. 1 apparatus in accordance with the invention of cross-reference No. 4 above containing a feature of the present invention comprises, in part, a ventilated storage subassembly 1, a rotational drive and support subassembly 2, an actuator subassembly 3 and a translational drive subassembly 4. These are combined and cooperative with pressure supply connections indicated schematically in FIG. 13 and head and head transport facilities suggested schematically in FIG. 5. The disk stack and actuator subassemblies are keyed for cco-rotation by the rotating drive part of drive and support subassembly 2 with the actuator subassembly free to be shifted relative to the disks by intermittent operations of translational drive subassembly 4. The storage subassembly is quite similar to one disclosed in the above cross-referenced application by Penfold et al.

Hub section 3-1 of the actuator subassembly operates within bore space 6 (FIG. 1) encompassed by aligned holes 6a in the individual storage disks 7 (FIGS. 1, 5A) of subassembly 1. Actuator 3 permits transmission of ventilation pressure to all inter-disk spaces in subassembly 1 and an increment of additional pressure to a single variably selected inter-disk space (hereinafter stack address or target address) which disturbs orbital displacement equilibrium of the disk surfaces and forms a positionally stable gap at the selected address suitable for receiving the head 8 (FIG. 5) in storage transducing position relative to otherwise inaccessible storage surfaces facing the gap position. The action sequence — of external head transportation, formation of access opening, insertion of head, transducing operation, withdrawal of head and reclosure of access opening — is functionally similar (except for the presently contemplated independent maneuvering of the actuator in advance of the head) to action sequences disclosed in the above-referenced prior art patents to Gutterman, Seidel and McGinnis et al. (cross-reference No. 3).

Actuator subassembly 3 comprises a hollow pressure transmission tube 3–2 which in an early embodiment (FIGS. 1, 2) contains a single pressure transmission channel. In a later embodiment (FIGS. 7, 8) to which present claims are directed (representing an improvement over the early embodiment for speeding up formation of the access split), the tube contains two separate channels. The single channel of the early embodiment and the innermost channel of the later embodiment are used to transmit a variable increment of pressure exclusively to a single address in subassembly 1. The outer channel in the latter embodiment is used for transmitting variable pressure, to a range of addresses symmetrically located on either side of the above-mentioned single address, which can be used to speed up gap formation (and thereby reduce access time) and control de-stabilizing pressure gradients.

Both embodiments operate relative to substantially identical storage, rotation drive and translation drive subassemblies.

2. Disk Stack Subassembly (FIGS. 1–7)

The disks 7 (FIGS. 1–3 and 5A) are floppy type storage disks — typically cut from uniform thin sheets (e.g. 0.001 inches thick) of mylar coated with magnetic oxide. The sheets are cut into the disk shapes (e.g. with 12 inch outer diameters) having central cut-outs 6a which form the bore space 6 in which the subject actuator operates. Successive disks are separated by uniformly thin (e.g. 0.003 inch thick) channeled spacers 9 (FIGS. 2, 6, 11) which have central holes 9a (FIG. 6) in registry with edges 6a of the disks, and radial ventilation channels 9b between spacing elevations 9c, formed either by etching or by fold-over of tab appendages. A typical stack would comprise from several hundred to in excess of several thousand such disk/spacer "pairs."

Figures 5, 5A, 15:
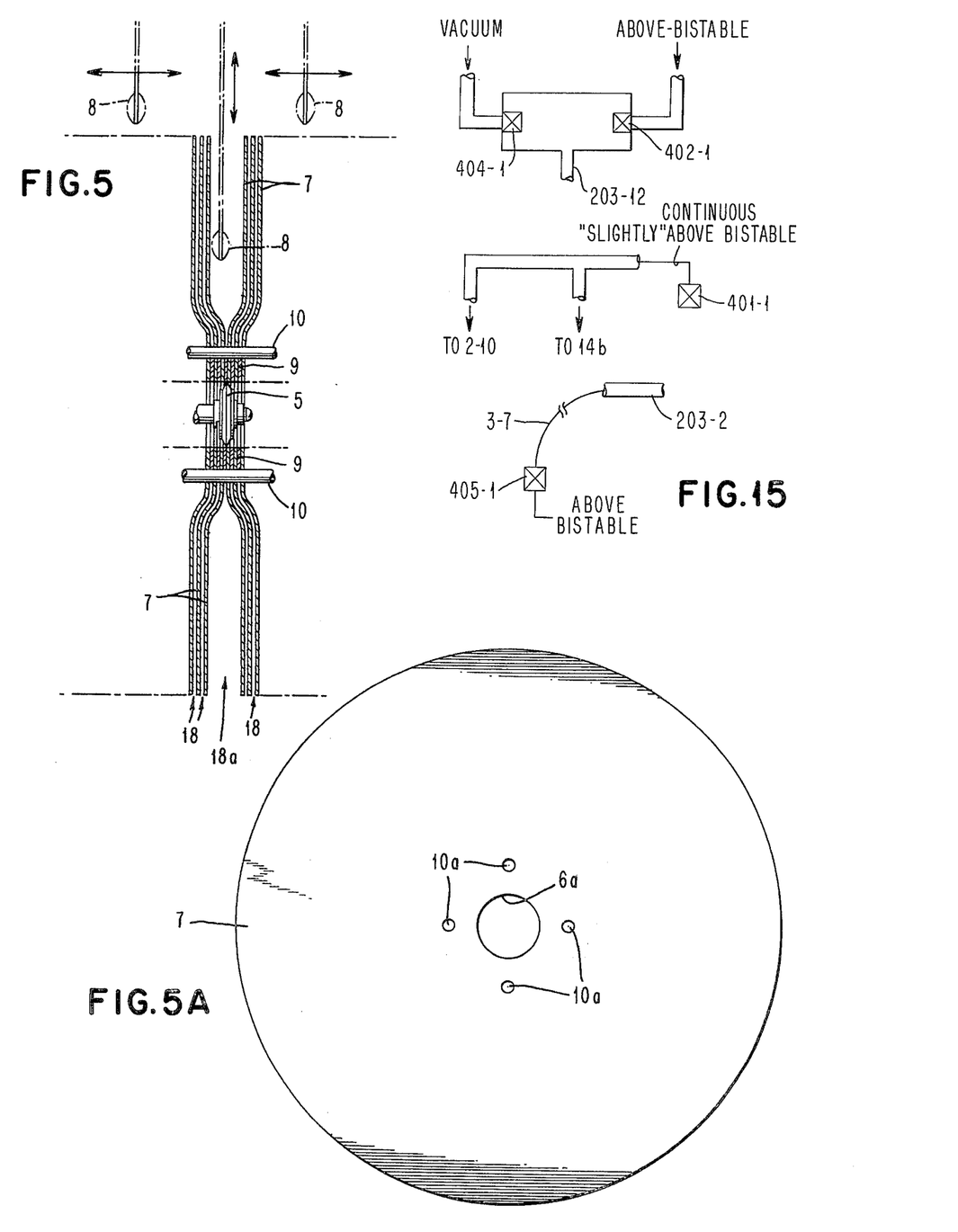
FIG. 5 schematically illustrates the externally transported head and its relation to the disks and to the operation of the subject invention.
FIG. 5A schematically illustrates a subject storage disk in elevation.
FIG. 15 schematically illustrates an alternative to the configuration of FIG. 14 for operating the two-channel actuator of FIG. 7 while guarding against the possibility of formation of multiple splits accompanied by wobble motion of intervening disks.
Figures 6, 8, 9, 10, 11:
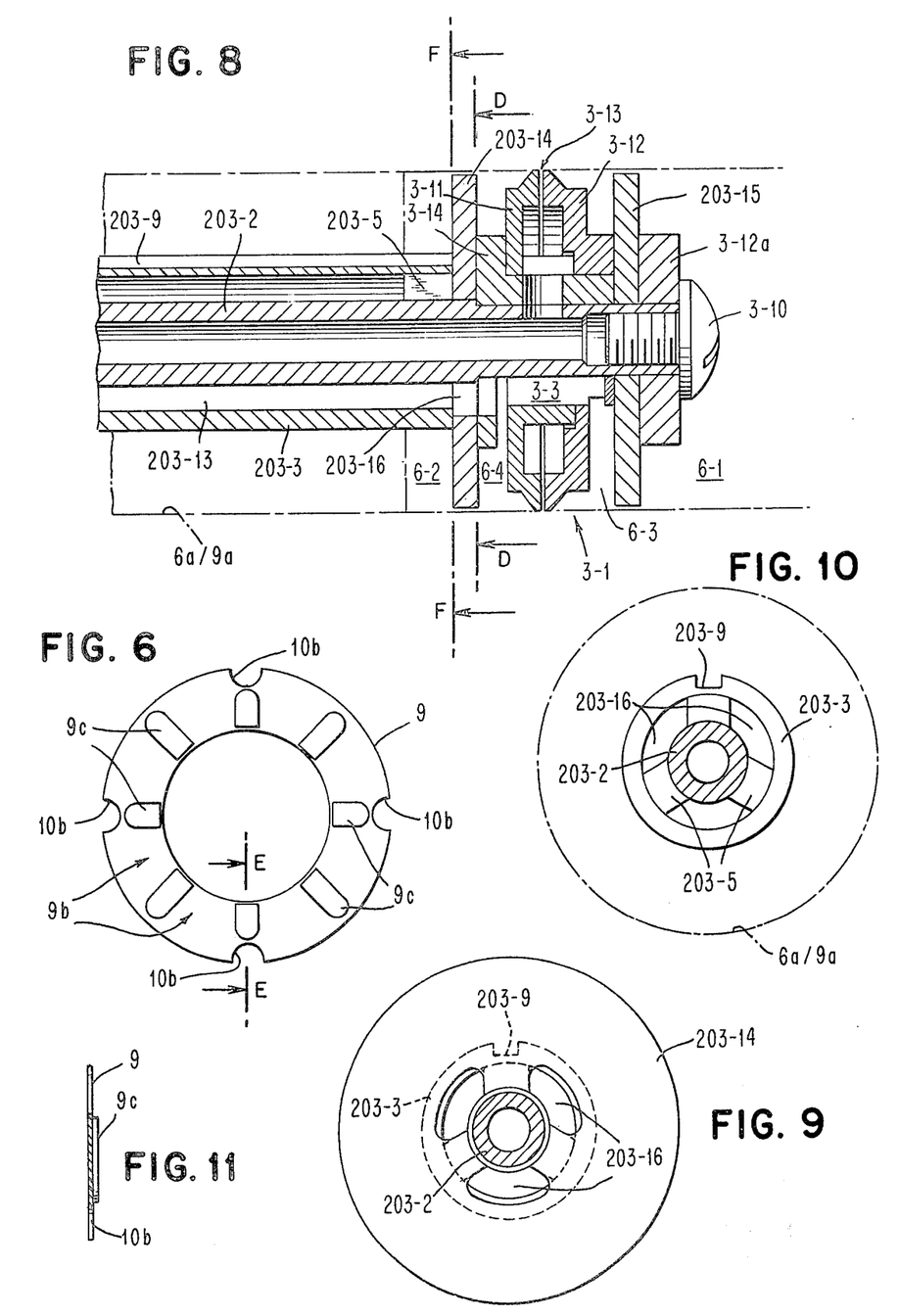
FIG. 6 illustrates a subject ventilation spacer used between storage disks to allow radial circulation of air to replenish air expelled from the spaces between the storage disks by centrifugal action.
FIG. 8 is an enlarged cut-away view of a portion of the apparatus shown in FIG. 7.
FIGS. 9 and 10 are views taken respectively along lines D—D and F—F in FIG. 8.
FIG. 11 is a view in section of a spacer, taken along lines E—E of FIG. 6.

The disks and spacers are mounted on (e.g. four) pins 10 (FIGS. 1, 2, 3, 5) via holes 10a in the disks (FIG. 5A) and indent cut-outs 10b in the outer edges of the spacers (FIG. 6). The disks and spacers are confined between inflexible end plates 11 and 12 (FIGS. 1, 2) having not-shown holes for receiving the pins 10. The end plates 11 and 12 are held by base plate members 13 and 14 (FIGS. 1, 2) also having not-shown holes for receiving the pins 10. For simplicity pins 10 are shown with threaded ends 15 and bolt-headed ends 16 (FIGS. 1, 2) forming bolt constructions by which assembly 1 is securable as a clamped unit by attachment of nuts 17 (FIGS. 1, 2) at respective pin ends 15.

Base plate 13 connects (FIGS. 1, 2) via its integral sleeve extension 13a and set screw 2-1.1 to sleeve extension 2-1.2 of driven pulley member 2-1 of subassembly 2 and thereby transmits continuous rotation to subassembly 1 (e.g at 1800 rpm). Obviously, if it is desired to treat subassembly 1 as a removable cartridge, severable attachment can be provided at this drive coupling interface.

"Normal" spacing 18 (FIGS. 1, 5) between the undeflected disks, due to spacers 9 and centrifugal forces on the disks, is too narrow to accommodate head 8 (FIG. 5) but the aggregate of these "normal" spaces between end plates 11 and 12 is suitable to permit deflective widening of one selected space sufficiently to form an access gap of the form 18a (FIG. 5).

Plate 14 has sleeve extension 14a (FIG. 1) receiving stationary pressure supply tube 14b (FIG. 1) in bearing support 14c (FIG. 1). Tube 14b is coupled via a not-shown opening in plate 14 to space 6-1 (FIG. 2) to the right of hub 3-1.

3. Rotation Drive and Support Subassembly (FIG. 1)

Subassembly 2 (FIG. 1) comprises rotating and stationary parts.

The rotating parts comprise (FIGS. 1, 2) the abovementioned pulley 2-1, one or more set screws 2-1.1, extension sleeve 2-1.2, journaling support sleeve 2-1.3, belt 2—2 and a not-shown motor. The motor continuously drives the belt which transmits continuous rotation through the pulley 2-1 and screw(s) 2-1.1 to sleeves 2-1.2, 2-1.3 and 13a. In turn sleeve 13a transfers rotation to subassembly 1.

The stationary parts comprise (FIGS. 1, 2) support base 2-3 having elevated support columns 2-4 and 2-5 which furnish bearing support for the rotating parts of the subject apparatus. Structures 2-4 and 2-5, and corresponding portions of support sleeve 2-1.3, and raceways containing bearings 2-6 which provide the necessary frictionless support of sleeve 13a and thereby of subassembly 1.

Figure 2:
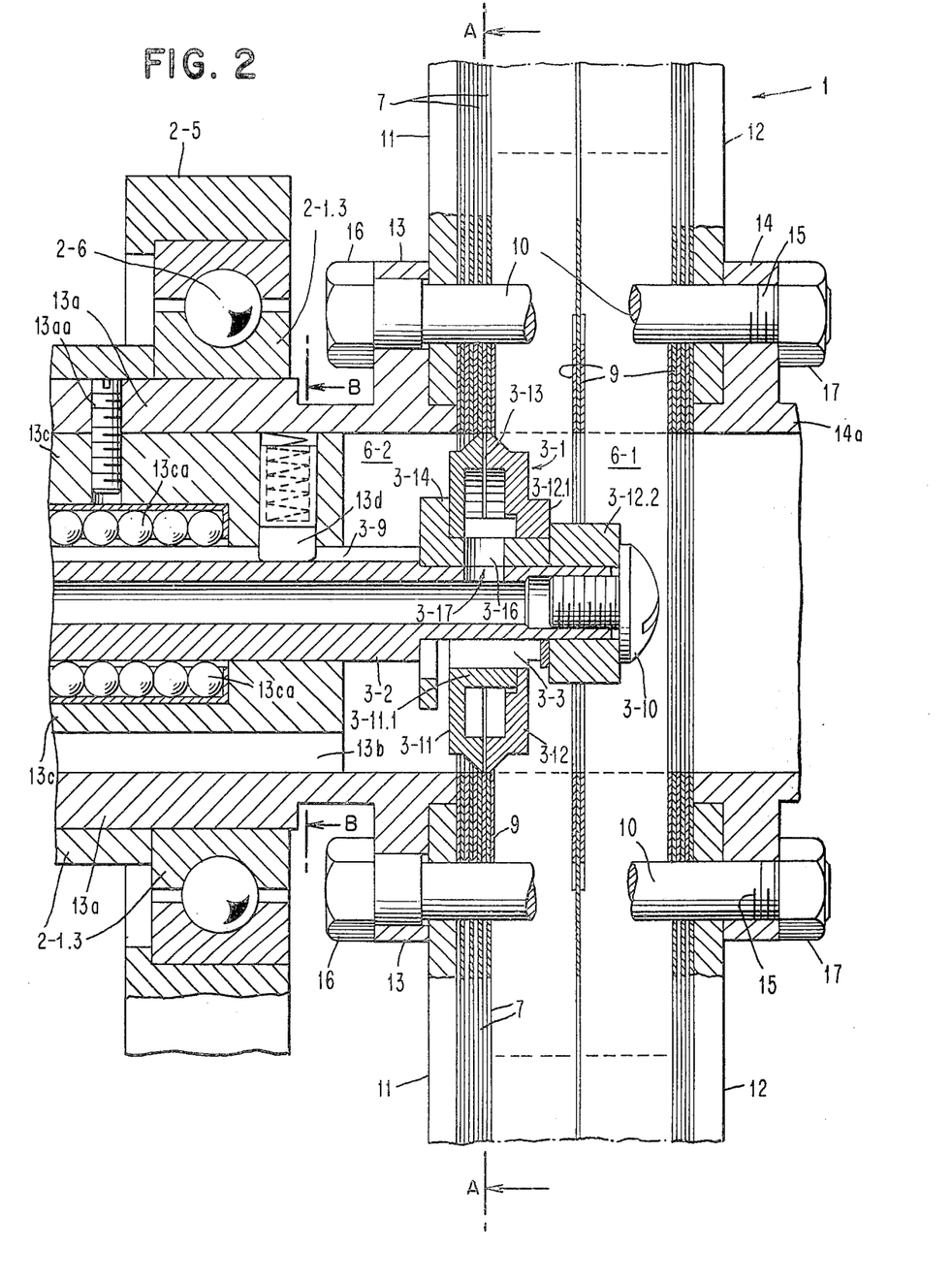
FIG. 2 is an expanded sectional view of a portion of the actuator apparatus shown in FIG. 1.

Cap 2-7, attached to stationary column 2-4 by screws 2-8, forms enclosed space 2-9 connecting with space 6-2 via open channels 13b (FIGS. 1, 2, 4) in channeled inner sleeve 13c (FIGS. 2, 4) which is attached to sleeve 13a by screw 13aa (FIG. 2). Tube 2-10 (FIG. 1) connects pace 2-9 with variable ventilation air pressure discussed below under "Operation". Pressures transmitted by tubes 2-10 and 14b to respective left and right portions 6-2 and 6-1 of space 6 (FIG. 2) are identical.

For reasons more fully explained later hub 3-1 has isolated cross channel passages 3-3 (FIGS. 2, 12) connecting space segments 6-1 and 6-2 in order to maintain uniform pressure throughout space 6 during translation movements of assembly 3.

4. Actuator Subassembly (FIGS. 1–4, 12)

The actuator subassembly 3 comprises constricted hollow tube 3-2 rotationally and slidably keyed to sleeve 13a, by means described below, for rotation with disk subassembly 1 and for permitting the tube and hub to be translated relative to the disks.

The rotation of hub 3-1 with the assembly 1 guards against friction due to irregularities. If the disks, spacers and hub are all precisely dimensioned the hub (and other parts of assembly 3) need not be adapted for rotation.

The outer end of tube 3-2 is supported rotatably in translatable column structure 3-3 by bearings 3-4 (FIG. 1). The tube extends through labyrinth seal construction 2-7.1 in cap 2-7 (FIG. 1) into space 6. The seal permits tube 3-2 to rotate and translate freely relative to stationary cap 2-7, while forming a sufficiently close fit with the tube to offer relatively high resistance to outward flow of air from space 2-9 through the seal interface (compared to aggregate resistance of spaces 9b — FIG. 3 — encompassing sub-space 6-2 of FIG. 2

Figure 13:
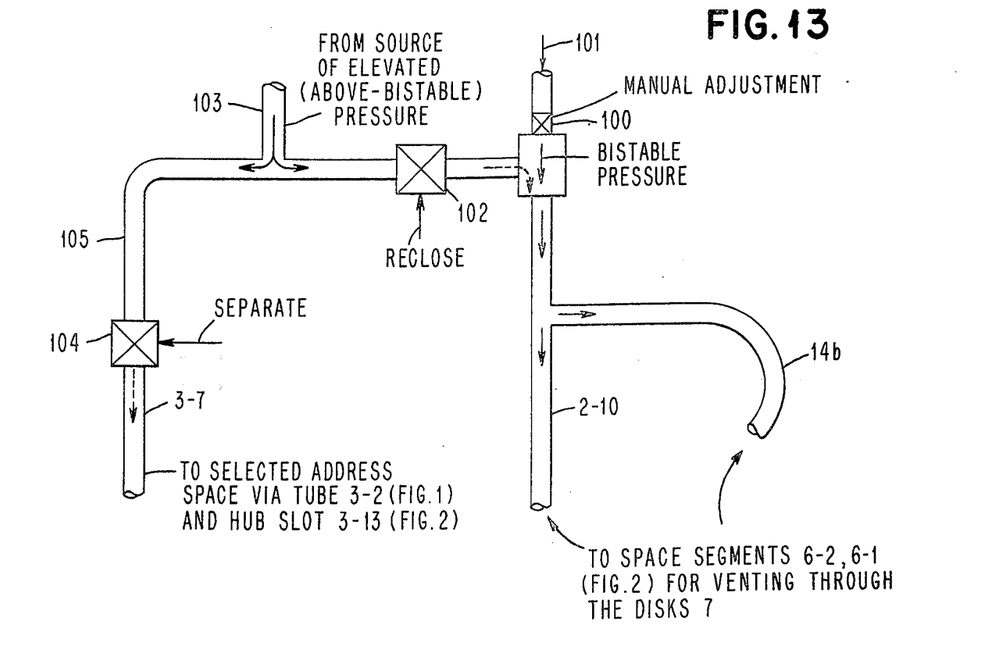
FIGS. 13 and 14 schematically illustrate pressure source connections for comparatively explaining the operations of respective embodiments of FIGS. 1 and 7.

Cap 3-3.1 (FIG. 1), attached by screws 3-5 to column 3-3, forms enclosed space -6 connecting open end 3-8 of tube 3-2 with an external source of incremental actuation pressure described below with reference to FIG. 13.

Column 3-3 is attached to carriage 4-1 of translation subassembly 4 described below for transmitting translation drive movements intermittently to actuator tube 3-2.

Rotational drive is transmitted to tube 3-2 from sleeve 13a (FIG. 2) via key 13d attached to sleeve 13a and retained slidably in keyway 3-9 (FIGS. 2,4) in tube 3-2. Keyway 3-9 is sufficiently long to permit hub 3-1 to be translated over the range of all disks in subassembly 1, but terminates within inner sleeve 13c (FIG. 4) so that it does not serve as a pressure conduit (this is not important for the present embodiment but it does play a role in the two-chamber embodiment of FIG. 7). Bearings 13ca (FIG. 2) provide frictionless sliding support between tube 3-2 and channeled sleeve 13c.

Hub subassembly 3-1 (FIGS. 2, 12) fits over a narrowed portion of the end of tube 3-2 and is rigidly secured to tube 3-2 by retaining screw 3-10 (FIG. 2)

which threads into the end of tube 3-2 and clamps the hub subassembly forcibly against the ridge formed at the narrowing transition of tube 3-2.

Figure 12:
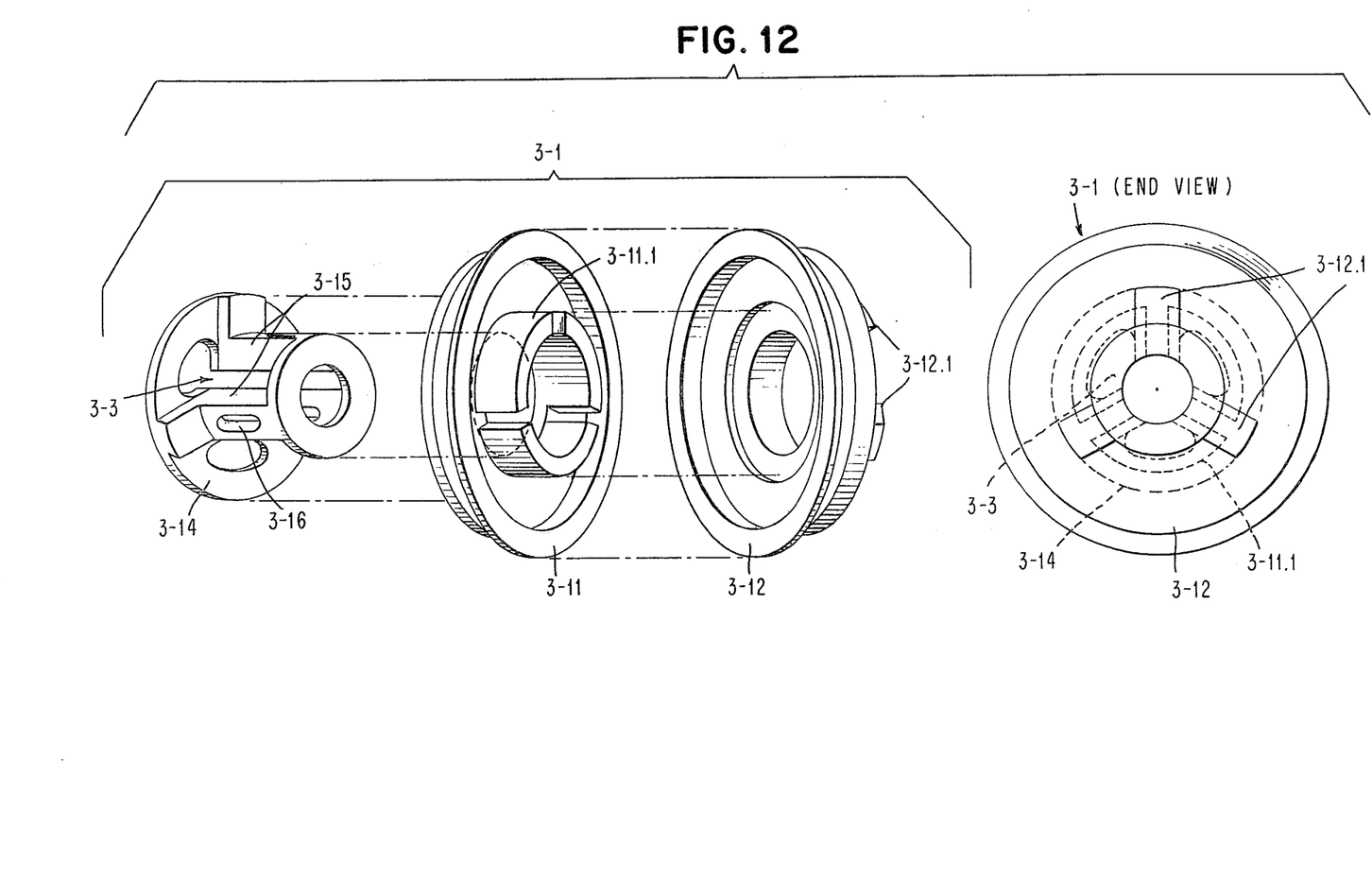
FIG. 12 contains assembly and end views of the slotted hub portion 3-1 of subject actuator tube apparatus.

Referring to FIGS. 2 and 12 the "hub-cap-like" parts 3-11 and 3-12, which have rims closely congruent with edges 6a/9a of the disks/spacers (except for slight clearance detailed below), have a "stand-off" fit forming a 360° actuation slot 3-13 (FIG. 2) slightly narrower than a single spacer 9 in subassembly 1 (i.e., about 0.002 inch). Parts 3-11 and 3-12 fit over "spool-like" part 3-14 which in turn fits over the narrowed end of tube 3-2 and is retained by the ridge formed at the narrowing transition. Ribs 3-15 in part 3-14 have holes 3-16 which are aligned with holes 3-17 (FIG. 2) in tube 3-2 forming connecting passages between the interior of tube 3-2 and the space within parts 3-11 and 3-12 encompassed by actuation slot 3-13. Channels 3-3 between the ribs 3-15 are covered inwardly by tube 3-2 and outwardly by stand-offs 3-11.1 of part 3-11 (see FIGS. 2 and 12) and are thereby isolated from the interior of tube 3-2 and holes 3-16, 3-17. As seen in FIG. 2 channels 3-3 connect spaces 6-1 and 6-2 and serve to equalize pressure differences in these spaces due to intermittent movements of tube 3-2.

Vanes 3-12.1 on part 3-12 extend channels 3-3 into sub-space 6-1. Washer 3-12.2 (FIG. 2), clamped against vanes 3-12.1 by the head of screw 3-10, completes the attachment of subassembly 3-1 to tube 3-2.

Exemplary hub and disk/spacer tolerance dimensions suitable for operation in accordance with paragraph 6 below are:
Peak diameter of hub rim: 1.500 +0, -0.0005 inches
Diameters disk/spacer holes 6a/9a: 1.5005 (minimum)

5. Translation Drive(FIG. 1)

Translation drive sub-assembly 4 comprises carriage 4-1 supported slidably on guide rails 4-1.1, and translatably on lead screw 4-2 via an internally threaded bore meshing with external threads on the lead screw (FIG. 1). The lead screw, when rotated intermittently by motor 4-3, transmits translation motion to carriage 4-1 for positioning hub slot 3-13 of assembly 3 in line with a selected spacer in subassembly 1.

6. Operation

Referring to FIGS. 1-5, 5A and 13 the apparatus of FIG. 1 operates as follows.

Disk subassembly 1 and tube 3-2 (including hub 3-1) receive continuous high speed rotation drive via belt 2-2, pulley 2-1, set screws 2-1.1 and 13aa, sleeve 13c and key 13d. Because of the close fit between the rim of hub 3-1 and edges 6a/9a of the disks/spacers it is preferred that these parts co-rotate (to avoid friction due to irregularities). Air is expelled from disk spaces 18 (FIGS. 1, 5) by centrifugal action. If this air is not fully replenished there are subpressures in spaces 18 tending to draw the unrestrained surfaces of the disks together.

Figure 3:
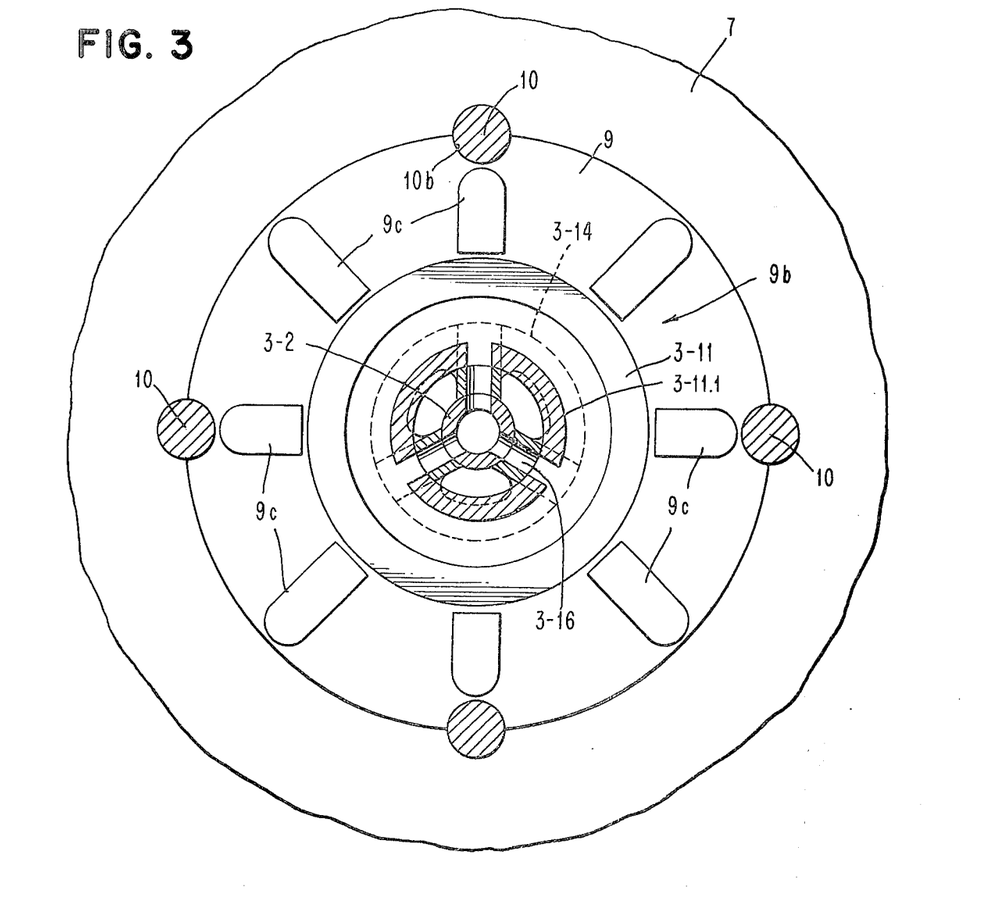
FIGS. 3 and 4 are sectional views of the apparatus in FIG. 2 respectively taken along lines A—A and B—B in FIG. 2.

Internal bore spaces 6-1 and 6-2 connect with spaces 18 in subassembly 1 through channels 9b in spacers 9 permitting transmission of ventilating air pressure from supply connections (FIG. 13) to spaces 18 via conduits 2-10 and 14b (FIGS. 1, 3). The difference in diameter between the apex of the rims of hub caps 3-11/12 and edges 6a/9a of the disks/spacers permits some leakage circulation of ventilating air from spaces 6-1, 6-2 into the spaces 18 covered by the rims of 3-11/12.

Spaces 6-1 and 6-2 are permanently connected, via tubes 2-10 and 14b and adjustable throttling passage 100 (FIG. 13), to a source 101 of constantly pressured air. The width of passage 100 is manually adjusted to transmit bistable equilibrium pressure (e.g. 2 to 5 inches of water) to all spaces 18 in accordance with the teachings of above-cross referenced application Ser. No. 484,830 by McGinnis et al (cross-reference No. 2). At this internal pressure spaces 18 remain subpressured. However, if the spaces 18 are all uniform (i.e., the stack is undivided), the displaceable portions of disks 7 exhibit bistable displacement equilibrium. That is, in the absence of any disturbing force the spaces 18 remain uniformly narrow (about 0.003 inches; i.e., the spacer dimension). If this equilibrium is upset due to momentary enlargement of one space 18 the disks transfer autonomously to a second stable equilibrium condition (FIG. 5) in which the one space is widened uniformly over its entire rotational ambit creating a gap 18a (typically 0.154 inches wide) suitable for receiving head 8 (at any circumferential angle).

As suggested above a condition desirable for creating this bistable equilibrium state is that the stack is undivided. As indicated in the above cross-referenced McGinnis et al. application, the pressure difference holding a split 18a can be overcome by elevating the ventilation pressure above the threshold level for bistable equilibrium. This can be accomplished presently by pulsing normally closed solenoid valve 102 (FIG. 13) open with signal "RECLOSE" (for at least 0.1 second), thereby transmitting "above-bistable" pressure from source supply line 103 (and its not-shown source) to all spaces 18 and restoring the stack to undivided ("closed") configuration. When valve 102 returns to its closed position the disks are in bistable deflection equilibrium in the undivided configuration.

If the last split 18a is not reclosed prior to the attempt to establish a new split, two splits may result, depending upon the distance between the old and new positions. When two splits form the intervening disks tend to wobble in unstable rotational orbits complicating head insertion and tracking.

In this configuration pulsing of normally closed valve 104 (activation of "SEPARATE" signal) to its open position will transmit above-bistable pressure to slot 3-13 (via tubes 3-7 and 3-2 and channels 3-16, 3-17) from supply line 105 and its not-shown source). This overcomes the subpressure in the space 18 nearest to slot 3-13 and causes separation deflection in the corresponding space 18, to the stable divided/accessible configuration 18a.

Thus, a complete sequence of operations of a storage system employing the apparatus in FIG. 1 is given by:

a. Hub slot 3-13 is positioned by operation of motor 4-3 relative to a space 18 to be selectively opened (e.g. by displacing actuator subassembly relative to either a reference such as plate 11, or from the last "known" position of slot 3-13 to the next position designated by the address furnished by the system and its attached "user" devices).

b. With head 8 outside of the stack (either initially or after having been withdrawn from a previous gap 18a) valve 102 is opened momentarily to couple "above-bistable" pressure to spaces 6-1 and 6-2; conditioning all spaces 18 to equal separation (monostable equilibrium).

c. Upon reclosure of valve 104 the disks 7 are in bistable equilibrium condition.

d. Next (or immediately after b) valve 104 is opened momentarily (e.g. for less than one-half second) to transmit "above-bistable" pressure via slot 3-13 to the selected address space, triggering divisional self-deflection of the disk surfaces on either side of the selected space to form the widened/accessible gap configuration 18a (FIG. 5).

e. Meanwhile head 8 is translated externally to the nominal center of the selected space 18 and when the gap opening 18a has stabilized (e.g. in one-half second after the initial signal to open valve 104) the head is moved radially into the opening in transducing relation to one of the facing disk surfaces.

f. Transducing operations are conducted with head 8 (for an indefinite interval determined by the storage or retrieval function required in the system).

g. Steps a-f are iterated.

Note that since valve 104 is closed during step f slot 3-13 can be repositioned to the next selection position while the head is still in the previous opening 18a without disturbing stack equilibrium; whereby the actuator can be re-positioned (step a) before transducing (step f) is completed. In this manner the process for selection and formation of the next "split" can be accelerated. In the alternative, if step a is delayed to completion of step f valve 104 may be opened during movement of the actuator. This would displace the disks passed by slot 3-13 in a "rippling" effect progressing from the position of the previous split to the designated new address. Although this would be slower than the pre-positioning procedure described above the rippling effect could be used to advantage to stimulate external sensory apparatus to count the rippling displacement transitions and thereby verify correct final positioning of the slot 3-13 at the designated target address.

7. Commentary-Buffer Zones

It is readily appreciated by one skilled in the art that the displacements of disks at the selected address space 18, to produce the opening 18a in the symmetrical form shown in FIG. 5, involve certain restrictions imposed by end plates 11, 12. The disks between the selected address and the nearest end plate must be displaceable by about one-half of the nominal width of 18a (nominally 5/.64 inch). Clearly at least twenty disks closest to each end plate cannot be so displaced having aggregate spacing of less than 20 × 0.003 inch (= 6/100 inch). In practice, since the disks cannot be fully compressed to touching contact, zones of about fifty disk/spacer pairs nearest each end plate 11, 12 are not used for storage and serve only as fillers for uniform ventilation and expansion.

8. Two-Channel Actuator (FIGS. 7-10, 14)

The two-channel actuator subassembly 203 shown in FIGS. 7-10 may operate relative to storage, drive and support subassemblies which are substantially identical to respective subassemblies shown in FIG. 1. In these figures part which are identical to corresponding parts in FIGS. 1, 2 are indicated by corresponding like reference numerals. The actuator and pressure parameters are different as described below in reference to FIG. 14.

Actuator subassembly 203 comprises an inner hollow tube 203-2 and an outer hollow tube 203-3 connected together at left and right extremities of tube 203-3 by radially spaced welded rib constructs 203-4 (FIG. 7) and 203-5 (FIGS. 8 and 10). Typically there are three uniformly spaced ribs at each extremity.

Figure 4:
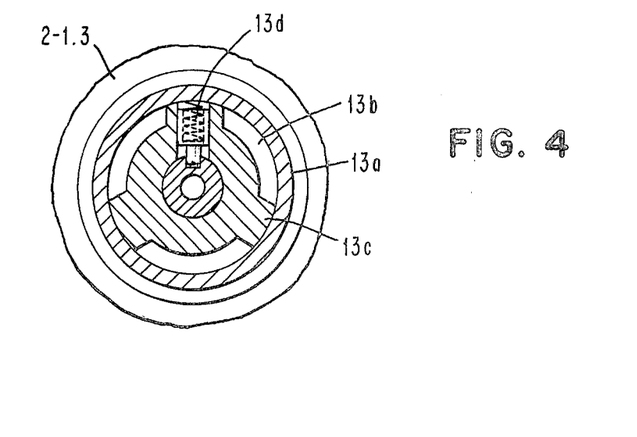

The inner tube 203-2 is identical in function to tube 3-2 of the single-chambered embodiment (FIG. 1) and almost identical in construction except that instead of being directly keyed to sleeve 13c for rotation (as at 3-9 FIG. 2) it receives rotation from 13c through its ribbed connections (203-4, 203-5) with outer tube 203-3 and the keying of the latter to 13c via keyway 203-9 (FIG. 8) and a key such as 13d (FIGS. 2, 4).

Figure 7:
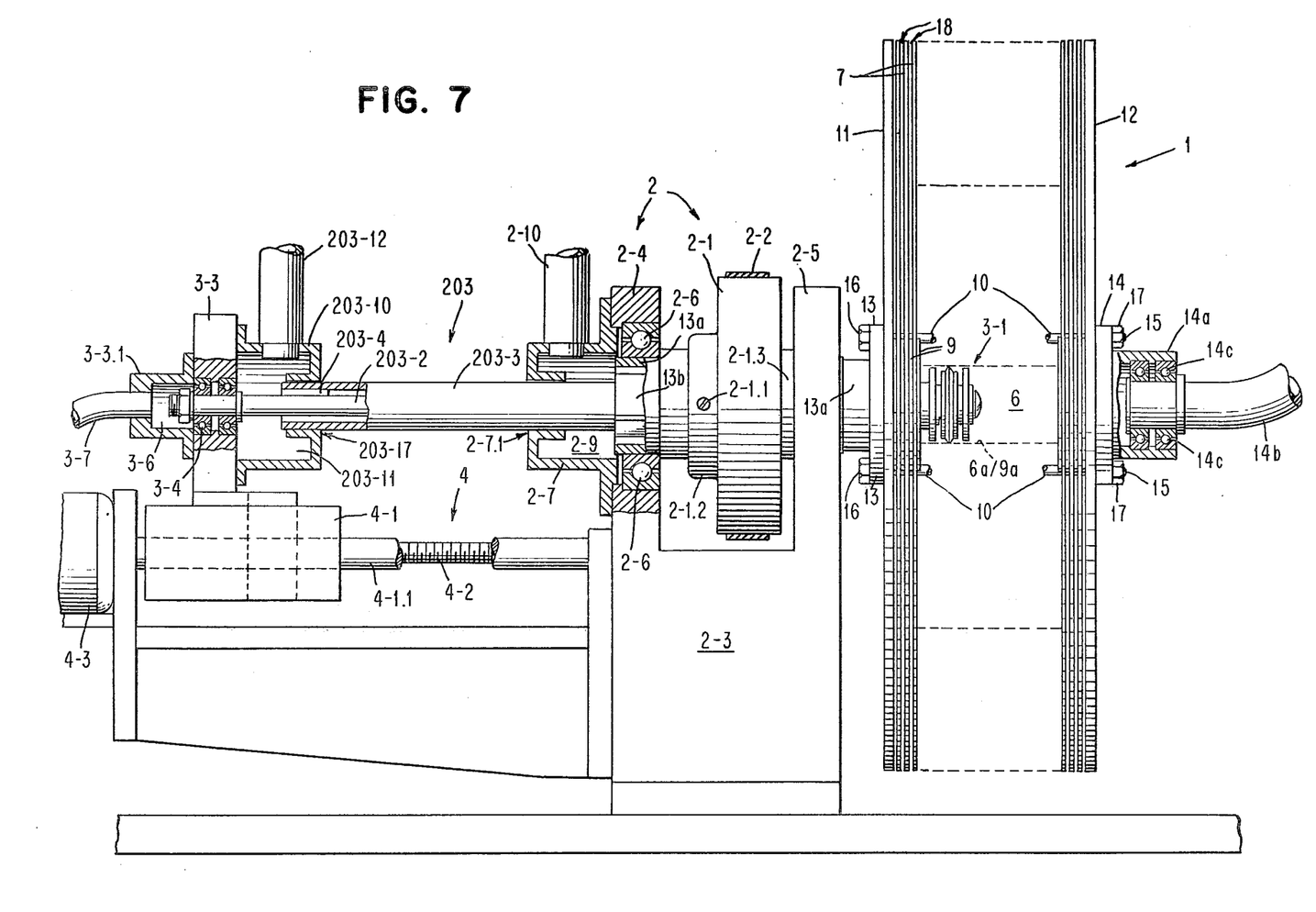
FIG. 7 is a schematic view in elevation partly cutaway of an embodiment of two-channel internal actuation apparatus in accordance with the present invention.

Column 3—3 (FIG. 7), which transmits translational motion from carriage 4-1 to subassembly 203, is identical in construction to column 3-3 in FIG. 1. However it has an additional cap attachment 203-10 which forms an enclosure 203-11 connecting the interior of hollow flexible tube 203-12 with the space 203-13 between tubes 203-2 and 203-3; through the spaces between ribs 203-4 (FIGS. 7, 8).

As its other extremity subassembly 203 contains control flange constructions 203-14 and 203-15 (FIG. 8) on opposite sides of hub 3-1 (identical to hub 3-1 of FIG. 1) at equal distances from actuation slot 3-13. The bore space 6 — encompassed by the holes 6a/9a in the disks/spacers of sub-assembly 1 (FIGS. 5A/6) and partitioned in two sub-spaces 6-1, 6-2 by hub 3-1 — is further partitioned by flanges 203-14, 203-15 into four pressurization sub-spaces 6-1, 6-2, 6-3 and 6-4. The control flanges span approximately 150 storage disk/spacer pairs in subassembly 1 and the outer sub-spaces 6-1, 6-2 span all other parts of sub-assembly 1 (typically there would be more than 500 disk/spacer pairs in subassembly 1) constituting the bulk of said sub-assembly.

Flange 203-14 has passages 203-16 (FIG. 10), aligned with spaces between ribs 203-5, for connecting spaces 203-13 (FIG. 8) with sub-space 6-4 which, in turn, connects with sub-space 6-3 through cross-channels 3-3 in hub 3-1 as shown in FIG. 8. Thus, spaces 3-3, 6-4 and 6-3 (FIG. 8) are always equally pressured by the pressure supplied to tube 202-12 (FIG. 7).

Tube 203-3 is enclosed by labyrinth seals 203-17 and 2-7.1 (FIG. 7) which permit free rotation of tube 203-3 relative to respective cover members 203-10 and 2-7. Further, since tube 203-3 is attached to tube 203-2 (by ribs 203-4, 203-5) and locked to hub assembly 3-1 (including plates 203-14 and 203-15) by screw 3-10, the assembly of tubes 203-2, 203-3 and hub 3-1 rotates and translates as a unit.

9. Operation

Referring to FIGS. 5, 7-10, 12 and 14 the apparatus operates as follows.

Disk subassembly 1 and rotatable parts of actuator subassembly 203 preferably co-rotate continuously as in the one-channel embodiment. Subassembly 203 is positioned to align hub slot 3-13 with a selected disk space 18 to be widened. The pressurization of the inner passages of the actuator connecting with slot 3-13 (via holes 3-16, FIG. 12) and of sub-spaces 6-1, 6-2, 6-3 and 6-4 is controlled according to the following schedule to produce the requisite deflection 18a at the selected space 18.

Sub-spaces 6-1 and 6-2 are supplied continuously with bistable pressure through manually adjusted/constricted pressure supply inlet 401 (FIG. 14) and tubes 2-10 and 14b. Sub-spaces 6-3 and 6-4 are supplied with dynamically variable pressure through tube 203-12 (FIGS. 7, 14) and actuator passages 203-13, 203-16 and 3-3 (FIG. 8).

Figure 14:
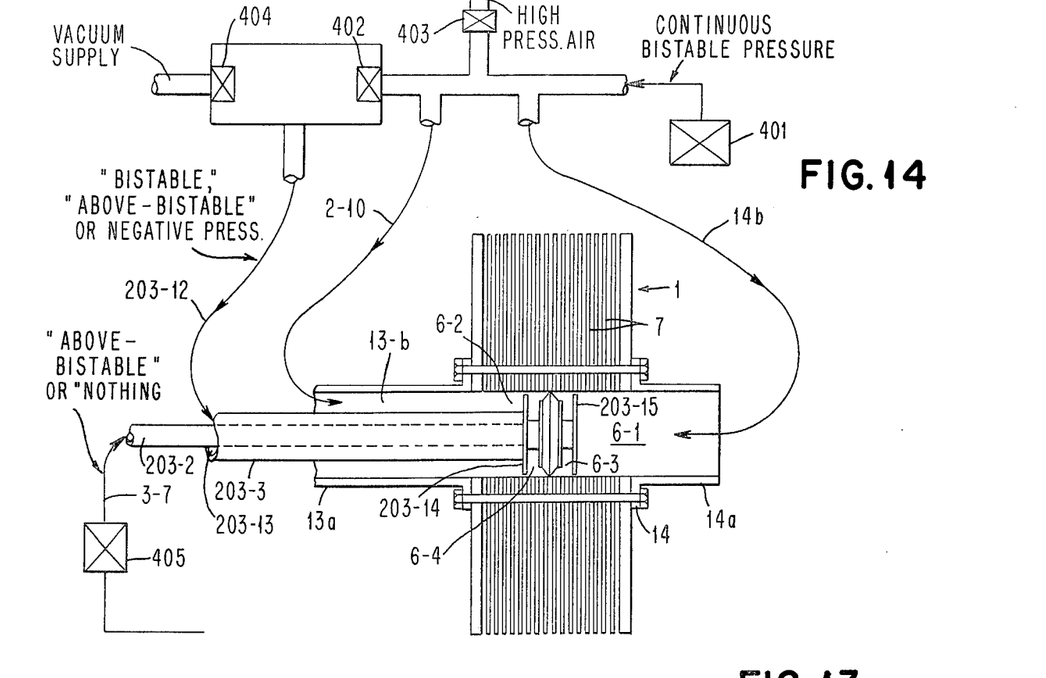

The pressure in tube 203-12 is controlled dynamically by operational states of (e.g. solenoid) valves 402 and 403 (FIG. 14). When 402 is open and 403 is closed bistable pressure is transferred to 203-12 from inlet 401. When both 402 and 403 are open elevated pressure (above-bistable) is transferred to 203-12, and also to 2-10 and 14b (closing any split). When 402 is closed and 404 is opened negative pressure is transferred to 203-12; useful to accelerate split opening transition 18a.

Hub slot 3-13 is pressured variably by operation of valve 405 (e.g. a solenoid valve). If 405 is open elevated (above-bistable) pressure is transferred, via tube 3-7 and inner tube 203-2, to the hub slot 3-13. If valve 405 is closed no interior pressure is applied to slot 3-13 and any disk space 18 aligned with hub 3-1 receives leakage pressure through sub-spaces 6-3 and 6-4.

Initially hub 3-1 is positioned to the next selection position. If head 8 is in a previous split it is removed. Valves 402 and 403 are pulsed open, closing any previous split. Then valve 402 is held open while all other valves are closed transferring bistable pressure to all inter-disk spaces.

Next the selected space 18 adjacent hub slot 3-13 is widened to form 18a by overlapped pulsed closure of valve 402 and opening of valves 404 and 405 (momentarily; e.g. for 1/10 second). This coincidentally transfers above-bistable pressure to slot 3-13 and negative pressure to sub-spaces 6-3 and 6-4; leaving sub-spaces 6-1 and 6-2 at bistable pressure. The positive pressure at slot 3-13 initiates peripheral deflection of disks 7, relative to the space 18 aligned with the slot, which is accelerated by the negative pressures developed in the adjacent spaces 18 aligned with sub-spaces 6-3 and 6-4.

Pressures in sub-spaces 6-3, 6-4 are then restored to bistable level immediately (within 1/10 second) after the start of the widening transition (by restoration of valve 402 to open position and valve 404 to closed position), and pressure in slot 3-13 is restored to zero level by closing valve 405. With this arrangement the selected space 18 is formed into the stable self-sustaining circumferentially uniform split configuration 18a in less time than with the one-channel actuator of FIG. 1 (within 1/10 second of the initiation of the transition as compared to ½ second).

The head 8 is positioned in the gap and operates for as long as required (i.e., according to the system function — number of tracks to be read/written, etc.). Meanwhile, since all spaces are at bistable equilibrium pressure, the actuator slot 3-13 may be pre-positioned opposite the next space to be widened and when the head is withdrawn from the gap (at completion of its operation) a new gap may be formed immediately at the next space by iteration of the above pressure schedule.

10. Exemplary Dimensions

Exemplary dimensions suitable for the foregoing operation are:
flanges:
  widths 0.063 inches
  rim diameters 1.496 (+0, −0.001) inches
  shapes: flat at rims
  space between flanges: ¾ inch
Disk/spacer holes (6a/9a) diameters: 1.5005 inches (min,)
hub rim peak diameter: 1.500 (+0, −0.0005) inch
hub rim width: 0.315 inch
hub taper from rim: 45°

11. Alternative Pressurization Without Prepositioning of the Actuator

FIG. 15 indicates an alternative pressurization arrangement for a two-channel actuator device which does not permit pre-positioning of the actuator (while the storage head is in operation) but offers advantage in terms of eliminating the possibility of multiple splits with intervening wobble instability. As mentioned above multiple splits are accompaied by unstable orbital motion (wobble) of intermediate disks which may complicate head insertion and record tracking.

The problem of multiple splits may be understood by referring to FIGS. 7 and 14. The pressures transferred to successive disk spaces 18, referenced to end plates 11, 12, decrease in a gradual gradient due to the progressively increasing distances from the source conduits (2-10, 14b). When bistable ventilation pressure is supplied this gradient could (in a sufficiently large stack) span a significant portion of th pressure range associated with bistable operation. In that event the design point for bistable operation would require increasingly tight control to prevent the possibility of spontaneous formation of plural splits due to the pressure gradient, with consequent wobble instability between splits.

Referring to FIGS. 7 and 15 the method employed to avoid this is to maintain above-bistable pressure continuously in spaces 6-1 and 6-2 (via adjusted opening 401-1 and conduits 2-10 and 14b). This prevents formation of splits in spaces 18 not spanned by the control flanges 203-14 and 203-15. The above-bistable pressure in spaces 6-1 and 6-2 is adjusted (manually) so that when valves 402-1 and 404-1 are closed the leakage flow from spaces 6-1 and 6-2 into spaces 6-3 and 6-4 (through the clearance between the control flanges and the disks) is sufficient to establish bistable pressure in spaces 6-3 and 6-4. Since the flanges span a relatively small number of disks (e.g. about 150 disk/spacer pairs) the gradient in each sub-space 6-3 and 6-4 relatively minor, and establishment of bistable operation between the flanges is not critical.

Initially, with the storage head 8 removed from the stack hub slot 3-13 is positioned to the address space at which the next split is to be formed. Valves 402-1. 404-1 and 405-1 are held closed so that spaces 6-3 and 6-4 receive bistable pressurization from "above-bistable" spaces 6-1 and 6-2 (through the clearances around control flanges 203-14 and 203-15.

The hub slot is aligned with the desired space 18 to be split and valve 405-1 is pulsed open supplying above-bistable pressure through the hub slot to be selected space 18. Simultaneously valve 404-1 is pulsed open transferring negative pressure to spaces 6-3 and 6-4. This produces a momentary pressure difference on both sides of the selected interface, accelerating the transition to the split formation 18a. As before the simultaneous pulsing of valves 404-1 and 405-1 is very brief (e.g. 1/10 second) and the valves thereafter are restored to their "normally" closed conditions.

Head 8 is positioned longitudinally to the split position and transferred radially into the split space for operation relative to the interfacing storage surfaces. The operation continues for an indefinite period which is a function of the system storage operation. Thereafter the head is retracted radially out of the split space and valve 402-1 is pulsed open to transfer above-bistable pressure to spaces 6-3 and 6-4 which exert closing forces on the disks on either side of the self-sustaining split. Then the foregoing procedure of actuator positioning, split, forming, head maneuvering and split closing is repeated.

The closing of the split (opening of valve 402-1) may be overlapped with the positioning movement of the actuator hub; subject to the restriction that the hub cannot be moved until the head is removed from the split.

If valve 405-1 is opened during the positioning movement of the actuator hub a constant stream of above-bistable pressure would be presented at the hub slot. This would cause a "rippling" effect whereby orbits of successive disks would be displaced one at a time until the hub arrives at the desired target address position. In this mode valve 404-1 could be either eliminated or synchronously pulsed open to accelerate the final ripple. If accelerated displacement of the disks is not important the valve 404-1 may be eliminated. The control flanges would then serve merely to delimit the bistable pressure gradient and not to speed up splitting.

While the invention has been particularly shown and described with reference to preferred embodiments thereof, it will be understood by those skilled in the art that various changes in form and detail may be made therein without departing from the spirit and scope of the invention.

What is claimed is:

1. Access actuation apparatus for sustainably separating normally inaccessible storage surfaces of flexible disks arranged in a rotating stack confined by inflexible end plates, successive said disks being nominally spaced by radially porous spacers, said stack encompassing a partially vacant space extending through all of said disks and spacers, said apparatus comprising:
    pressure transmittal means extending slidably into and partially filling said vacant space; and means having an enlarged hub section filling a portion of said space and effectively partitioning said space into at least partially vacant first and second sub-spaces; said means having an enclosed first pressure transmittal channel extending between said hub section and the exterior of said stack; said hub section having a narrow opening connected with said first channel and a cross channel construction isolated from said first channel for connecting vacant portions of of said first and second sub-spaces; and
    means for variably pressuring said first channel and said vacant portion of at least one of said sub-spaces to cause sustainable split displacement effects relative to said storage surfaces by which said surfaces are rendered selectively accessible for storage transducing operations.

2. Access actuation apparatus for sustainably separating normally inaccessible storage surfaces of flexible storage disks which are arranged in a rotating stack and are confined between inflexible plates, successive said surfaces being nominally spaced by radially porous spacers interposed between said disks, said stack encompassing a partially vacant space extending through the stack between said plates, said apparatus comprising:
    pressure transmittal means extending slidably through at least one of said plates and partially filling said partially vacant space; said means containing first and second enclosed channels isolated from each other which define pressure transmission passages extending through said at least one plate; one of said channels terminating within said partially vacant space in a narrow orifice alignable with a single said spacer in a closely congruent fit; the other said channel terminating within said partially vacant space in an opening connecting with a vacant portion of said space in near proximity to but isolated from said orifice;
    means coupled to said channels for variably pressuring said channels in order to produce a sustainable split spacing effect relative to surfaces interfacing at a spacer aligned with said orifice; and
    means for slidably manipulating said transmittal means relative to said spacers to selectively position said split effect.

3. Apparatus according to claim 2 wherein said transmittal means includes a narrow hub section containing said congruently fit orifice and effectively partitioning said partially vacant space into first and second discrete sub-spaces.

4. Apparatus according to claim 3 wherein said hub section contains a cross-channel passage connecting vacant portions of said sub-spaces; said cross-channel passage being isolated from said one channel.

5. Apparatus according to claim 4 including:
    first and second partitioning members disposed in respective said sub-spaces equidistant from said orifice; said members effectively partitioning said respective sub-spaces into discrete proximate and remote respective sub-space segments characterized in that: the respective proximate segments are adjacent opposite sides of said hub section and connected by said cross-channel passage; the respective remote segments are separated from said hub section by respective proximate segments; the proximate segments are equally dimensioned; and a vacant part of one of said proximate segments is directly connected with said other channel via said opening in said other channel.

6. Apparatus according to claim 5 wherein said variably pressuring means includes means for transiently reducing the pressure in said other channel and proximate segments, relative to pressures in said one channel and in vacant parts of said remote segment, in order to speed-up the formation of a said split effect.

7. Apparatus according to claim 6 wherein said variably pressuring means includes means for variably pressuring vacant parts of said proximate and remote segments to effectuate selective preservation of said split effect during said manipulating of said transmittal means and selective erasure of one said split effect prior to creation of another said split effect at another position in said stack.

8. Apparatus according to claim 6 wherein said variably pressuring means includes means for continuously pressuring vacant parts of said remote segments at a relatively elevated level at which the associated pressure between storage surfaces aligned with said remote segments opposes deflective displacement of said aligned sufaces; whereby said split effect is subject to formation only in the group of storage surfaces spanned by said partitioning members.

9. Apparatus according to claim 5 wherein said split effect is initiated by pressure transmitted transiently through said one channel and sustained by sustaining pressure transferred to vacant parts of said proximate segments via said other channel.

10. Apparatus according to claim 9 wherein said sustaining pressure is in a range associated with producing a bistable equilibrium effect relative to the rotational orbits of storage surfaces spanned by said partitioning members.

* * * * *